3,375,100
VACUUM DEGASSSING OF METAL MELTS
Eugen Vopel, Dortmund, and Horst Kutscher, Dortmund-Berhofen, Germany, assignors to Dortmund-Horder Huttenunion Aktiengesellschaft, Dortmund, Germany
No Drawing. Filed July 22, 1965, Ser. No. 474,140
Claims priority, application Germany, Aug. 4, 1964,
D 45,110
3 Claims. (Cl. 75—49)

The degassing of liquid metals by vacuum treatment generally takes place in the way in which gases dissolved in the metal reach the surface by flow and diffusion processes and then are removed from there. In so far as there is a sufficiently large excess of dissolved gases in comparison with the equilibrium for the partial pressure of the gases concerned over the melt, degassing can take place through the formation of bubbles. The latter generally form at irregularities on the walls and bottom of the container of the metal. However the formation of bubbles is slowed down as the hydrostatic pressure increases towards the bottom of the degassing vessel through the increase in the height of the liquid metal.

The object of the invention is to achieve an economically useful vacuum degassing even in the latter cases and otherwise to accelerate and improve the degassing of metals, particularly iron and steel melts.

To this end, according to this invention, after the beginning of a vacuum degassing treatment, seeds of finely comminuted substances able to initiate the formation of gas bubbles are introduced into the surface part of the metal melt, the seeds being inactive with respect to the metal to be degassed and not changing its composition and condition. Preferably the seeds are finely comminuted metals of the same composition as that of the melt being degassed. In this way both unalloyed and alloyed metals, particularly iron and steel melts, can be treated in a vacuum.

The process according to the invention will be illustrated by the following example:

A steel melt with 0.18 to 0.25% carbon, 0.30 to 0.50% manganese, 0.10 to 0.15% silicon by weight, small contents of phosphorus and sulphur and the remainder iron is first vacuum degassed for long enough for the formation of bubbles at the bottom of the vacuum container to begin to slacken. Then fine comminuted material from the chilled iron of an earlier charge of the same composition is introduced into the vacuum container from its bottom or roof so that it passes to the region close to the surface of the melt to be degassed. The particle size of the seeding metal should be less than 1 mm. and preferably between 10 and 100 microns. Its proportion to the melt weight varies with the nature and the purity of the melt from 100 to 2000 grams per metric ton.

Directly after the addition of the seeds, brisk bubble formation begins again in the region close to the surface of the melt and with it further intensive degassing starts again. Since this action is initated and continues even with a small proportion of the seeds the melt temperature remains unaffected.

Alloy steel may be degassed in a vacuum with the same success, e.g., a ball bearing steel with 0.95 to 1.95% carbon, 1.4 to 1.65% chromium, 0.25 to 0.40% manganese, 0.15 to 0.30% silicon by weight, small contents of phosphorus and sulphur, and the remainder iron.

We claim:
1. A process for the acceleration and improvement of the vacuum degassing of metal melts, characterised in that after the beginning of a vacuum degassing treatment, seeds of finely comminuted metals of the same composition as the metal melt being degassed are introduced into the surface part of the metal melt to initiate the formation of gas bubbles.

2. A process according to claim 1 in which the seeds have a particle size of between 10 and 100 microns.

3. A process according to claim 1, in which between 100 and 2000 grams of seeds are added per metric ton of the melt present in the vacuum vessel.

References Cited

Distillation Techniques of Organic Chemistry; vol. IV, Interscience Publishers; 1951; pp. 491–493.

DAVID L. RECK, *Primary Examiner.*

H. M. TARRING, *Assistant Examiner.*